United States Patent
Hornback et al.

(10) Patent No.: US 10,216,258 B1
(45) Date of Patent: Feb. 26, 2019

(54) VEHICLE THERMAL SYSTEM FOR REDUCED FUEL CONSUMPTION

(71) Applicants: Daniel E Hornback, Davisburg, MI (US); Huaguo Chen, Troy, MI (US); Kevin J Laboe, Birmingham, MI (US)

(72) Inventors: Daniel E Hornback, Davisburg, MI (US); Huaguo Chen, Troy, MI (US); Kevin J Laboe, Birmingham, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 15/668,212

(22) Filed: Aug. 3, 2017

(51) Int. Cl.
| | |
|---|---|
| *B60H 1/32* | (2006.01) |
| *F01P 5/04* | (2006.01) |
| *F01P 7/04* | (2006.01) |
| *G06F 1/32* | (2006.01) |
| *B60K 11/08* | (2006.01) |
| *G05D 23/19* | (2006.01) |
| *G05D 23/27* | (2006.01) |
| *G06F 1/3293* | (2019.01) |

(52) U.S. Cl.
CPC ......... *G06F 1/3293* (2013.01); *B60H 1/3208* (2013.01); *B60H 1/3227* (2013.01); *G05D 23/27* (2013.01); *B60H 2001/3266* (2013.01); *B60K 11/085* (2013.01); *F01P 5/04* (2013.01); *F01P 7/04* (2013.01); *F01P 2025/66* (2013.01); *G05D 23/1927* (2013.01)

(58) Field of Classification Search
CPC .. G06F 1/3293; G05D 23/27; G05D 23/1927; B60H 1/3227; B60H 1/3208; B60H 2001/3266; F01P 7/04; F01P 5/04; F01P 2025/66; B60K 11/085
See application file for complete search history.

(56) References Cited

U.S. PATENT DOCUMENTS

| | | | |
|---|---|---|---|
| 5,963,458 A | 10/1999 | Cascia | |
| 6,213,061 B1 | 4/2001 | Bartolazzi et al. | |
| 6,637,229 B1* | 10/2003 | Forrest | B60H 1/3208 62/183 |
| 8,209,073 B2 | 6/2012 | Wijaya et al. | |
| 8,467,936 B2 | 6/2013 | Wijaya et al. | |
| 9,527,404 B2* | 12/2016 | Gauthier | B60L 11/1874 |
| 2007/0112475 A1 | 5/2007 | Koebler et al. | |
| 2015/0032285 A1 | 1/2015 | Conan et al. | |
| 2017/0361698 A1* | 12/2017 | Hussain | B60K 11/02 |

* cited by examiner

*Primary Examiner* — Russell Frejd
(74) *Attorney, Agent, or Firm* — Ralph E Smith

(57) ABSTRACT

A method of minimizing overall power consumption of a vehicle cooling system includes performing a hardware selection phase, performing an actuator position selection phase, and configuring operation of selected hardware components of the vehicle cooling system at a selected actuator position combination when the vehicle is operating in a predefined driving condition.

17 Claims, 5 Drawing Sheets

| | HARDWARE ITEM | PARAMETER /VARIATION | SIZE OR RANGE |
|---|---|---|---|
| 1 | FRONT-END GRILLE OPENING | OPENING AREA (WIDTH/HEIGHT) | VARIES DEPENDING ON VEHICLE |
| 2 | GRILLE TEXTURE | TEXTURE DENSITY | VARIES FROM LOW DENSITY TO HIGH DENSITY |
| 3 | COOLING MODULE STACK | LAYERS | VARIES FROM 1 LAYER TO 4 LAYERS |
| 4 | RADIATOR FACE AREA (ASPECT RATIO) | ASPECT RATIO WIDTH /HEIGHT | VARIES DEPENDING ON VEHICLE, VARIES FROM 1 TO 1.5 |
| 5 | RADIATOR THICKNESS | CORE THICKNESS | VARIES FROM 12MM TO 52 MM |
| 6 | RADIATOR FIN DENSITY | AIR FIN DENSITY | VARIES FROM 50 FINS/DM TO 90 FINS/DM |
| 7 | COOLING FAN SIZE | FAN WATTAGES | VARIES DEPENDING ON VEHICLE, 400 WATTS TO 900 WATTS |
| 8 | WATER PUMP SIZE | PULLEY RATIO | VARIES FROM 1 TO 2 |

FIG. 3

| | ACTUATOR | CONTROL | RANGE |
|---|---|---|---|
| 1 | AGS POSITION CONTROL (ACTIVE GRILLE SHUTTER) | % OF FULL OPEN | 10 OR 16 DISCRETE POSITION FROM FULL CLOSED (0%) TO FULL OPEN (100%) |
| 2 | FAN SPEED CONTROL - PWM DUTY CYCLE | % OF MAX SPEED | CONTINUOUS POSITION FROM FULL CLOSED (0%) TO FULL OPEN (100%) |
| 3 | COOLANT VALVE POSITION CONTROL | % OF FULL OPEN | CONTINUOUS POSITION FROM FULL CLOSED (0%) TO FULL OPEN (100%) |
| 4 | WATER PUMP SPEED CONTROL | % OF MAX SPEED | CONTINUOUS POSITION FROM OFF (0 RPM) TO MAX SPEED |
| 5 | LOW TEMP ELECTRIC WATER PUMP SPEED CONTROL | % OF MAX SPEED | CONTINUOUS POSITION FROM OFF (0 RPM) TO MAX SPEED |
| 6 | EGR VALVE POSITION CONTROL | % OF FULL POSITION | CONTINUOUS POSITION FROM FULL CLOSED (0%) TO FULL OPEN (100%) |
| 7 | TRANSMISSION HEATER VALVE POSITION CONTROL | % OF FULL OPEN | CONTINUOUS POSITION FROM FULL CLOSED (0%) TO FULL OPEN (100%) |
| 8 | AC COMPRESSOR DISPLACEMENT CONTROL | % OF MAX DISPLACEMENT | CONTINUOUS POSITION FROM MIN DISPLACEMENT TO MAX DISPLACEMENT (100%) |

FIG. 4

| DRIVING CONDITION | VEHICLE SPEED | VEHICLE MASS | ROAD CONDITION | AC | AMBIENT |
|---|---|---|---|---|---|
| | [mph] | [-] | [-] | [-] | [°C] |
| RESIDENTIAL CRUISE W/ AC | 30 | GVW | FLAT HWY | ON | 27 |
| HIGHWAY CRUISE W/ AC | 50 | GVW | FLAT HWY | ON | 27 |
| EXPRESSWAY CRUISE | 80 | GVW | FLAT HWY | OFF | 27 |
| EXPWY CRUISE W/ AC | 80 | GVW | FLAT HWY | ON | 27 |
| HOT EXPWY CRUISE W/ AC | 80 | GVW | FLAT HWY | ON | 32 |
| HOT EXPWY TRAILER CRUISE | 75 | GCW | FLAT HWY | ON | 43 |

FIG. 5

VEHICLE THERMAL SYSTEM FOR REDUCED FUEL CONSUMPTION

FIELD

The present application relates generally to vehicle thermal systems and, more particularly, to a system and method for optimizing thermal system power usage to reduce vehicle fuel consumption.

BACKGROUND

Conventional vehicle cooling system design and control mainly focuses on keeping fluid temperatures within allowable limits. As such, the vehicle cooling systems are typically designed to meet maximum vehicle performance under the most extreme ambient conditions. However, such driving conditions are rarely experienced and the cooling systems are therefore often oversized for normal daily driving conditions. As such, the cooling systems may unnecessarily consume large amounts of power, thereby potentially increasing fuel consumption and reducing vehicle efficiency. Accordingly, while such conventional cooling systems work well for their intended purpose, it is desirable to provide an improved vehicle cooling system.

SUMMARY

According to one example aspect of the invention, a method of minimizing overall power consumption of a vehicle cooling system is provided. In one exemplary implementation, the method includes performing a hardware selection phase and performing an actuator position selection phase. Performing the hardware selection phase includes selecting a plurality of hardware components for the vehicle cooling system, at least one hardware component having a plurality of types thereof, each type affecting a power consumption of that hardware component such that each type of that hardware component has a different power consumption at a first predefined driving condition, determining all possible combinations of the selected hardware components and types thereof, for each possible hardware component combination, determining a first overall power consumption at the first predefined driving condition, comparing the determined first power consumptions of each of the possible hardware component combinations, and selecting a hardware component combination from all the possible combinations that has the lowest determined first overall energy consumption. Performing the actuator position selection phase includes defining a plurality of actuator positions for one or more of the hardware components of the selected hardware component combination, determining all possible actuator position configurations of the selected hardware component combination, for each possible actuator position configuration, determining a second overall power consumption of the selected hardware components at a second predefined driving condition, and selecting an actuator position combination from all the possible actuator position combinations that has the lowest determined second overall energy consumption. The method further includes operating the hardware components of the vehicle cooling system at the selected actuator position combination when the vehicle is operating at the second predefined driving condition.

In addition to the foregoing, the described method may include one or more of the following features: wherein the step of determining a first power consumption comprises determining an individual power consumption for each hardware component of each possible combination of hardware components and type at the predefined driving condition, and for each hardware component combination, summing the individual power consumptions of all the hardware components to determine a first power consumption; wherein the step of determining a second power consumption comprises determining an individual power consumption for each hardware component of each possible actuator position configuration at a second predefined driving condition, and for each actuator position configuration, summing the individual power consumptions of all the hardware components to determine a second power consumption; wherein the first and second predefined driving conditions are the same; and wherein the first and second predefined driving conditions are different.

In addition to the foregoing, the described method may include one or more of the following features: wherein the second predefined driving condition is chosen from the group of residential cruise with air conditioning, highway cruise with air conditioning, expressway cruise, expressway cruise with air conditioning, hot expressway cruise with air conditioning, and hot expressway trailer cruise with air conditioning; wherein the plurality of types are size variations; wherein the plurality of types are texture variations; wherein the hardware components are selected from the group of a vehicle grille system, a cooling fan, a high temperature water pump, a low temperature water pump, a coolant control valve, and an AC compressor; and further comprising determining if the selected hardware component combination exceeds vehicle durability filtering constraints, disqualifying the selected hardware component combination if the selected hardware component combination exceeds the vehicle durability filtering constraints, and selecting a new hardware component combination from all the remaining possible combinations that has the lowest determined first overall energy consumption.

In addition to the foregoing, the described method may include one or more of the following features: further comprising determining if the selected actuator position configuration exceeds vehicle durability filtering constraints, and disqualifying the selected actuator position configuration if the selected actuator position combination exceeds the vehicle durability filtering constraints; wherein the step of determining if the selected actuator position configuration exceeds vehicle durability filtering constraints comprises defining an acceptable engine oil temperature (DDT) limit, determining an EOT for each actuator position configuration at the second predetermined driving condition, and disqualifying each hardware component configuration with a determined EOT greater than the acceptable EOT limit; and wherein the step of determining if the selected actuator position configuration exceeds vehicle durability filtering constraints further comprises defining an acceptable engine coolant temperature (ECT) limit at the second predetermined driving condition, determining an ECT for each remaining actuator position configuration at the second predetermined driving condition, and disqualifying each actuator position configuration with a determined ECT greater than the acceptable ECT limit.

In addition to the foregoing, the described method may include one or more of the following features: wherein the step of determining if the selected actuator position configuration exceeds vehicle durability filtering constraints further comprises defining an acceptable delta engine temperature limit at the second predetermined driving condition, determining a delta engine temperature for each remaining actuator position configuration at the second predetermined driving condition, and disqualifying each actuator position configuration with a determined delta engine temperature greater than the acceptable delta engine temperature limit; and wherein the step of determining if the selected actuator position configuration exceeds vehicle durability filtering constraints further comprises defining an acceptable air charge temperature (ACT) limit at the second predetermined driving condition, determining an ACT for each remaining actuator position configuration at the second predetermined driving condition, and disqualifying each actuator position configuration with a determined ACT greater than the acceptable ACT limit.

In addition to the foregoing, the described method may include one or more of the following features: wherein the step of determining if the selected actuator position configuration exceeds vehicle durability filtering constraints further comprises defining an acceptable cooling fan temperature limit at the second predetermined driving condition, determining a cooling fan temperature for each remaining actuator position configuration at the second predetermined driving condition, and disqualifying each actuator position configuration with a determined cooling fan temperature greater than the acceptable cooling fan temperature limit; and wherein the step of selecting an actuator position configuration comprises selecting an actuator position configuration from all the remaining possible actuator position configurations after the disqualified actuator position configurations are removed from consideration.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a chart illustrating a plurality of hardware components that may be used in the system shown in FIG. 1, in accordance with the principles of the present disclosure;

FIG. 4 is a chart illustrating a plurality of actuator positions for hardware components that may be used in the system shown in FIG. 1, in accordance with the principles of the present disclosure; and FIG. 5 is a chart illustrating a plurality of driving conditions under which the system shown in FIG. 1 may operate in accordance with the principles of the present disclosure.

DETAILED DESCRIPTION

The present application is directed to improving vehicle fuel economy and minimizing the overall energy consumption of a vehicle cooling system. In one example, each device in the cooling system is treated as an energy consumer, and a controller determines which combination of consumers and individual consumer settings are the most efficient for cooling during a set of vehicle driving conditions. The consumed energy for cooling purposes can be generally divided into five categories: hydraulic power, aerodynamic drag power, cooling fan power, electrical power, and viscous friction power loss. The presently described system sums the energy consumed by each consumer, and determines and selects the least overall power consuming combination out of all possible combinations.

Figure 1:
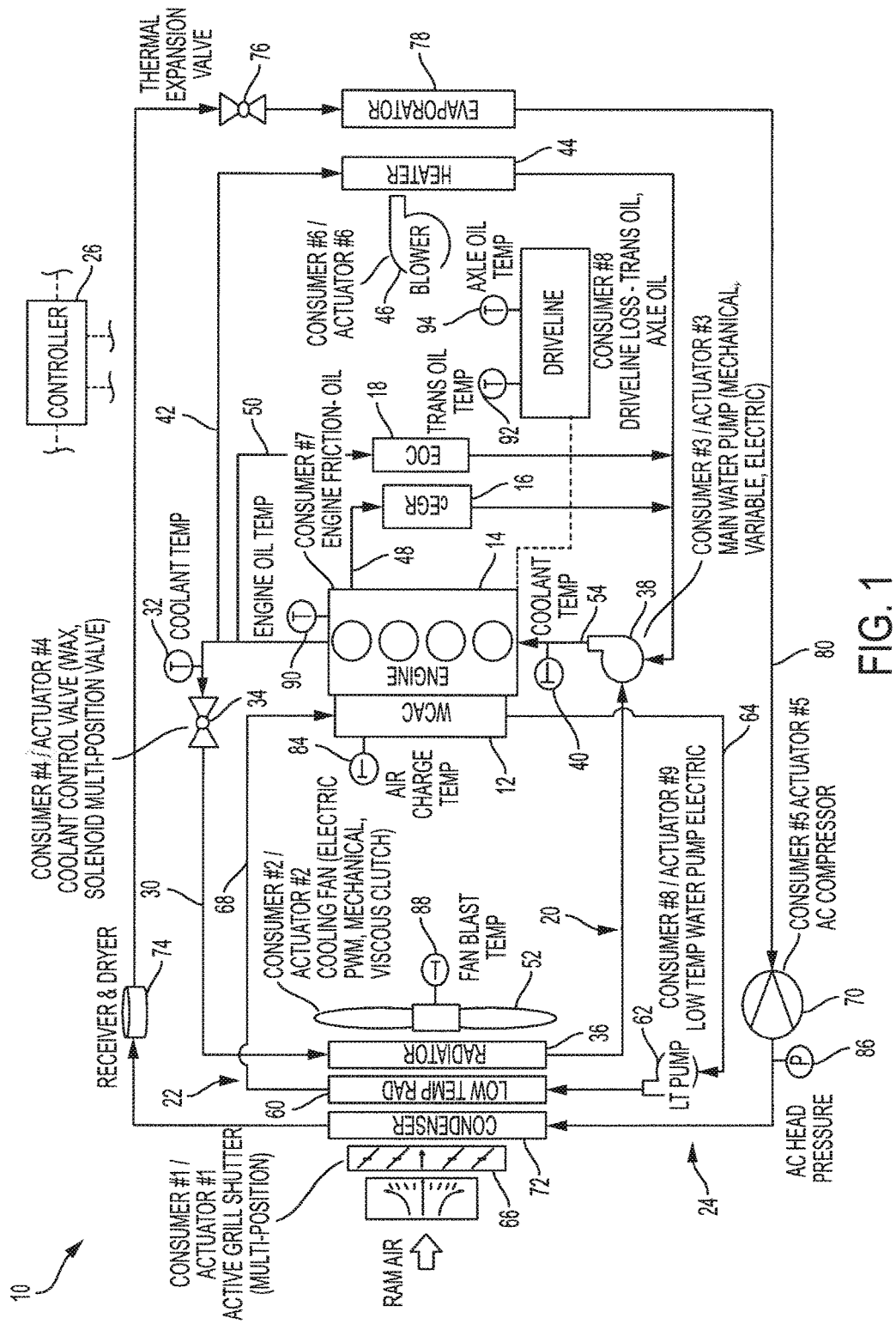
FIG. 1 is a schematic view of an example vehicle system in accordance with the principles of the present disclosure.

With initial reference to FIG. 1, an example vehicle cooling system is illustrated and generally identified at reference numeral 10. The cooling system 10 is configured to provide cooling to various components of the vehicle such as an intercooler 12, a vehicle engine 14, an exhaust gas recirculation (EGR) cooler 16, and an engine oil cooler 18. The intercooler 12 receives hot compressed air from a charger (not shown), absorbs heat therefrom, and subsequently supplies cooled, compressed air to an intake and cylinders (not shown) of the engine 14.

In one exemplary implementation, the cooling system 10 generally includes a high temperature circuit 20, a low temperature circuit 22, and an air conditioning circuit 24. In one exemplary implementation, the circuits 20, 22, 24 are discrete circuits fluidly separate from each other.

The cooling system 10 is in signal communication with a controller 26 such as an engine control unit (ECU), which is in signal communication with various power consuming hardware components (e.g., "consumers") and sensors. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

With continued reference to FIG. 1, in one exemplary implementation, the high temperature circuit 20 circulates a first heat transfer fluid or coolant (e.g., water) and generally includes a main circuit 30 having a temperature sensor or thermostat 32, a coolant control valve 34, a high temperature radiator 36, a pump 38, a second temperature sensor 40. A first branch circuit 42 includes a cabin heat exchanger 44 operably associated with a blower 46. A second branch circuit 48 includes EGR cooler 16, and a third branch circuit 50 includes engine oil cooler 18. The first coolant is heated by engine 14 and is subsequently supplied main circuit 30, first branch circuit 42, second branch circuit 48, and third branch circuit 50.

The main circuit 30 directs heated coolant to the high temperature radiator 36, where the heated coolant is cooled by ambient air and/or an air flow created by a fan 52. Coolant control valve 34 is configured to vary the amount of flow of the first coolant through the high temperature circuit. The cooled first coolant is then supplied to a coolant supply line 54.

The first branch circuit 42 directs the heated coolant to the cabin heat exchanger 44 where thermal energy of the heated coolant is used to provide heating to the vehicle passenger cabin (not shown). The heated coolant is cooled by ambient air and/or an air flow created by blower 46, and the cooled coolant is then directed to the coolant supply line 54.

The second branch circuit 48 directs the heated coolant to the EGR cooler 16 where thermal energy of the EGR gas flow is transferred to the coolant via indirect thermal contact within the heat exchanger 16. The third branch circuit 50 directs the heated coolant to the engine oil cooler 18 where thermal energy of the engine oil is transferred to the coolant via indirect thermal contact within the heat exchanger 18.

The pump 38 is disposed within circuit 20 and is configured to circulate the first coolant around the high temperature circuit 20. In the example embodiment, the first coolant may be selectively supplied to branch circuits 42, 48, 50 such that each of the branch circuits may be used alone or in any combination. As such, pump 38 supplies the cooled coolant within supply line 54 to the engine 14 to provide cooling thereto.

In one exemplary implementation, the low temperature circuit 22 is fluidly separate from high temperature circuit 20 and circulates a second heat transfer fluid or coolant such as water. In the illustrated example, the low temperature circuit 22 is dedicated to providing cooling to only the intercooler 12. Low temperature circuit 22 generally includes a low temperature radiator 60 and a pump 62. The second coolant is heated within intercooler 12 against the hot compressed air from the charger, and is directed to low temperature radiator 60 via a conduit 64.

The heated second coolant is cooled within the low temperature radiator 60 by ambient air and/or ram airflow from fan 50. As used herein, ram airflow is the amount of ambient air forcing through a vehicle active grille shutter (AGS) 66 and heat exchange from dynamic air pressure created when the vehicle is in motion. Pump 62 is disposed within circuit 22 and is configured to circulate the second coolant around the low temperature circuit 22. As such, pump 62 supplies the cooled coolant from radiator 60 to coolant supply line 68.

With continued reference to FIG. 1, in one exemplary implementation, air conditioning circuit 24 is a standard vehicle air conditioning system that generally includes a compressor 70, a condenser 72, a receiver/dryer 74, an expansion device 76, and an evaporator 78.

In operation, a suction line 80 provides gaseous refrigerant to compressor 70, which subsequently compresses the refrigerant. The compressed and heated refrigerant is directed to the condenser 72 where the heat from compression is dissipated and the refrigerant condenses to a liquid. The liquid refrigerant is directed through expansion device 76 (e.g., an expansion valve) where t is reduced in pressure and vaporized, thereby reducing the temperature of the refrigerant. The cooled vapor refrigerant is then supplied to evaporator 78 where it is evaporated to providing cooling to the cabin air. The resulting gaseous, warmed refrigerant is then returned to the compressor 70 via suction line 80 where the cycle is repeated.

In the example embodiment, engine 14 is coupled to a driveline 82, which includes both transmission oil and axle oil that is heated by the engine coolant, thereby reducing the transmission and axle torque loss or increases the transmission and axle efficiency by reducing the oil viscosity.

Accordingly, in the illustrated example, system 10 includes nine hardware components that are cooling power consumers, namely: coolant control valve 34, high temperature pump 38, blower 46, radiator fan 52, low temperature pump 62, AGS 66, compressor 70, engine oil of engine 14, and transmission/axle oil of driveline 82. Of these nine consumers, seven are actuatable to various positions, which affects their cooling power consumption. These seven include coolant control valve 34, HT pump 38, blower 46, radiator fan 52, LT pump 62, AGS 66, and compressor 70.

System 10 also includes a plurality of sensors such as, for example, temperature sensors 32 and 40, an air charge temperature sensor 84, an AC circuit pressure sensor 86, a fan temperature sensor 88, an engine oil temperature sensor 88, an engine oil temperature sensor 90, a transmission oil temperature sensor 92, and an axle oil temperature sensor 94.

As described herein in more detail, a two-part process is utilized to reduce power draw of cooling system 10 to reduce overall vehicle fuel consumption. The first step is a power consuming hardware component selection phase where, for a set of steady state driving conditions, the size/style of each desired power consuming hardware component for the vehicle cooling system is chosen to achieve the lowest power consuming configuration out of all possible hardware combinations, while still meeting all cooling functional objectives. In the second step, for a set of steady state driving conditions, actuator positions for each of the power consuming hardware components are selected to achieve the least power consumption while still meeting all cooling functional objectives.

Figure 2:
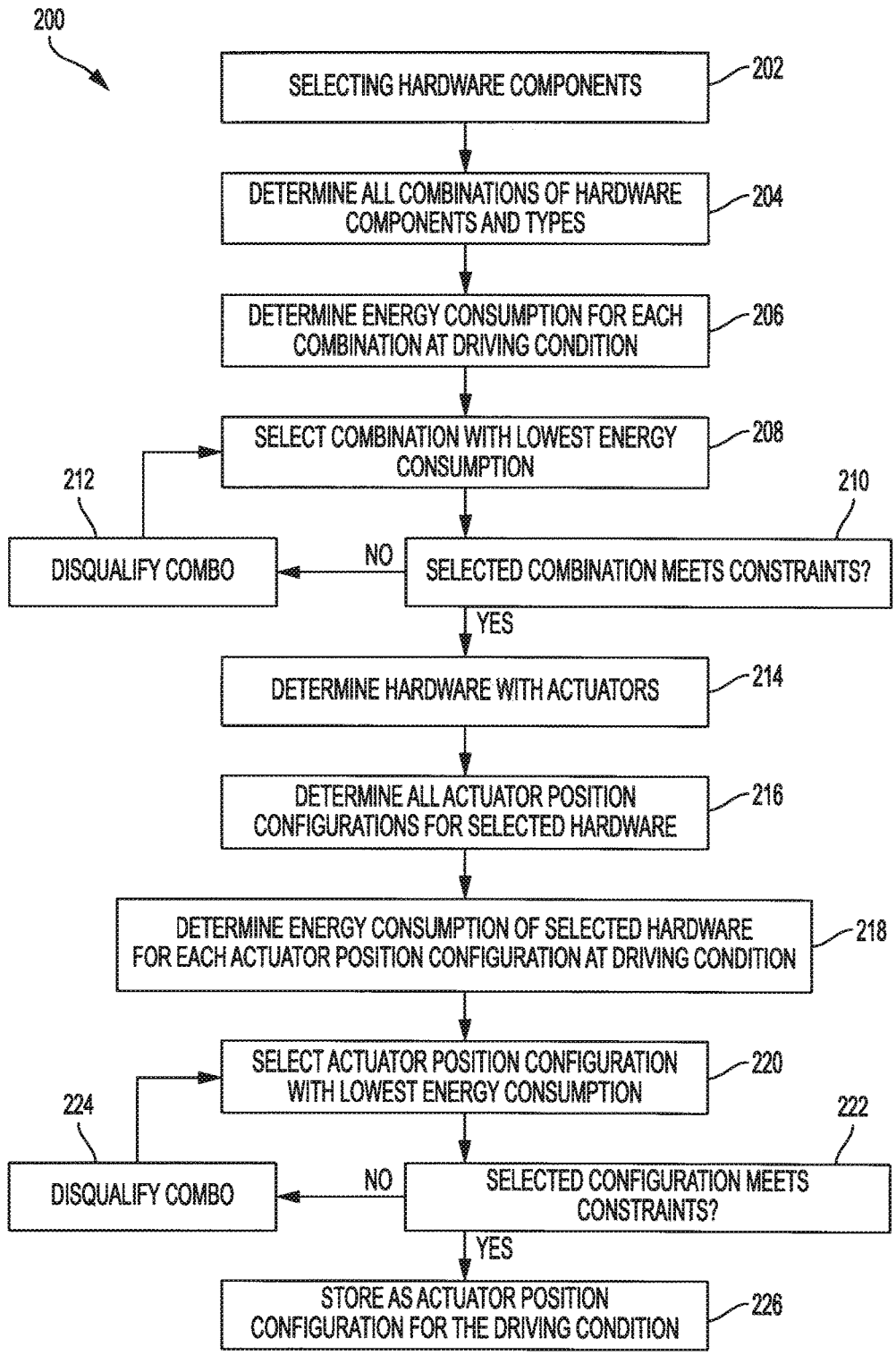
FIG. 2 is a flow diagram illustrating an example method of minimizing an overall power consumption of the system shown in FIG. 1, in accordance with the principles of the present disclosure.

FIG. 2 illustrates a method 200 of minimizing the overall energy consumption of a vehicle cooling system to improving vehicle fuel economy. The method includes, at step 202, selecting a group one or more vehicle hardware components that will be utilized to optimize (i.e., minimize) the overall energy consumption of the vehicle cooling system 10.

In one example embodiment, the vehicle hardware components selected are part of and/or affect the power consumption of vehicle cooling system 10. For example, with reference to FIGS. 1 and 3, the hardware components can include a vehicle grille system (e.g., AGS 66, radiator 36), cooling fan 88, high temperature water pump 38, low temperature water pump 62, coolant control valve 34, and AC compressor 70. However, it will be appreciated that additional components that are part of and/or affect vehicle cooling power consumption may be selected.

As shown in FIG. 3, each hardware component has a plurality of versions or types to choose from, and each type affects the cooling system energy consumption of that particular hardware component.

In one example, the available types of water pump 38 to choose are three different sizes (small, medium, and large), which are based on a maximum flow output of water pump 38 at a particular engine RPM. For example, the small type of water pump 38 has a lower maximum flow output than the medium type of water pump 38, which has a lower maximum flow output than the large type of water pump 38. In the same manner, each type of water pump 38 will consume a different amount of power when operating at a particular flow rate.

In another example shown in FIG. 3, the types of the vehicle grille system to choose from include the size of radiator 36 (small, medium, large), the size of a front end opening of grille shutter 66 (small, medium, large), a grille texture of grille shutter 66 (low, medium, and high restriction), and a radiator air fin spacing of radiator 36 (fins/dm). In a similar manner, each of these hardware types has a different power consumption at steady state driving conditions, for example, based on cooling drag, which is the aerodynamic drag on the vehicle caused by cooling system components such as the radiator, condenser, and cooling fan shroud. In one example, the aero drag power consumption of the grille system (AGS 66, radiator 36)=f (drag coefficient, front area, vehicle speed, air density, driveline efficiency).

At step 204, the method includes determining all possible combinations of the hardware components and types for the group of hardware components selected in step 202. Each combination includes one type of each of the hardware components. For example, if the selected group includes two hardware components (C1, C2) that each have two size types (v1, v2), then there are a total of four possible hardware component combinations for that group (i.e., C1v1-C2v1, C1v1-C2v2, C1v2-C2v1, C1v2-C2v2). Similarly, if the selected group includes three hardware components that each have three size types, then there are a total of twenty-seven possible hardware component combinations for that group.

At step 206, the overall energy consumption is determined for each possible hardware/type combination for the selected group of hardware components. In one example, this is done by first determining the energy consumption of each individual hardware component of the selected group at a predefined steady state driving condition, such as a "normal" driving condition (e.g., 90% of typical driving). For example, such driving conditions can be a steady state 80 mph, on a flat grade, with no trailer, AC off, and 27° C. ambient temperature. However, it will be appreciated that any desirable driving conditions may be set when determining the energy consumption of the selected hardware. The individual energy consumptions of each hardware component are then summed to find the overall energy consumption of system 10 for that selected hardware component combination.

In one example, each individual energy consumption is determined as follows: Aero drag power consumption of the grille system (AGS 66, radiator 36)=f (drag coefficient, front area, vehicle speed, air density, driveline efficiency); cooling fan 52 power consumption=f (airflow, pressure rise, fan efficiency, alternator efficiency); water pump 38 power consumption=f (coolant flow, pressure rise, pump efficiency); low temperature water pump 62 power consumption=f (current draw, voltage, alternator efficiency); coolant control valve 34 power consumption=f (current draw, voltage, alternator efficiency); engine friction power consumption=f (engine speed, torque, engine oil temperature or viscosity); transmission spin loss power consumption=(speed, torque, gear, transmission oil temperature or viscosity, efficiency); AC compressor 70 power consumption=f (suction pressure, discharge pressure, speed); and blower 46 power consumption=f (current draw, voltage, alternator efficiency).

At step 208, the group hardware combination with the lowest overall energy consumption is selected. At step 210, it is determined if the selected group hardware combination is capable of meeting filtering constraints such as extreme cooling requirements (e.g., maintaining target temperatures while towing a trailer on a steep grade in hot ambient temperatures). For example, cooling system 10 utilizes one or more fluid temperatures or pressures such as engine coolant temperature (ECT), engine oil temperature (EOT), transmission oil temperature (TOT), coolant temperature delta across engine, AC head pressure, and air charge temperature (ACT), to filter constraints imposed on the optimization results in order to protect vehicle durability. Group hardware combinations that result in violations of the filtering constraints (e.g., extreme cooling requirements) are disqualified as candidates for the lowest power consumption configuration. In other examples, all disqualified candidates are removed before selecting the group hardware combination with the lowest overall energy consumption.

Accordingly, if the selected group hardware combination exceeds the filtering constraints, at step 212, the selected group hardware combination is disqualified and the method returns to step 208 (with the previous selected hardware combination unavailable for selection). If the selected group hardware combination meets the filtering constraints, the method proceeds to step 214 with the selected group hardware combination.

At step 214, each hardware component of the selected combination that has an actuator movable to a plurality of positions is determined. As shown in FIG. 4, one or more of the available hardware components includes a plurality of actuator positions, and each actuator position affects the energy consumption of that particular hardware component.

In one example shown in, water pump 38 includes any position between 0% flow and 100% flow. In another example, AGS 66 includes any position between full closed and full open.

At step 216, the method includes determining a set of actuator positions for the selected group hardware combination. In one example, all possible actuator positions are determined. For example, if the selected group hardware combination includes two hardware components (C1, C2) that each have two actuator positions (p1, p2), then there are a total of four possible actuator position combinations or configurations for the previously selected group hardware combination (i.e., C1p1-C2p1, C1p1-C2p2, C1p2-C2p1, C1p2-C2p2). Similarly, if the selected group hardware configuration includes three hardware components that each have three actuator positions, then there are a total of twenty-seven possible actuator configurations for the previously selected group hardware combination.

At step 218, the overall energy consumption is determined for each possible actuator position configuration of the previously selected group hardware combination. In one example, this is done by first determining the energy consumption of each individual hardware component at that selected actuator position for a predefined steady state driving condition (e.g., the normal driving condition). The individual energy consumptions are then summed to find the overall energy consumption for that particular actuator configuration of the previously selected group hardware combination. The individual energy consumption of each hardware component can be determined as previously described herein.

At step 220, the actuator position configuration with the lowest overall energy consumption is selected. At step 222, it is determined if the selected actuator configuration is capable of meeting vehicle durability constraints. For example, cooling system 10 utilizes one or more fluid temperatures or pressures such as ECT, EOT, TOT, coolant temperature delta across engine, AC head pressure, and air charge temperature (ACT), to filter constraints imposed on the optimization results in order to protect vehicle durability. Actuator position configurations that result in violations of the filtering constraints (e.g., extreme cooling requirements) are disqualified as candidates for the lowest power consumption configuration. In other examples, all disqualified candidates are removed before selecting the actuator position configuration with the lowest overall energy consumption.

Accordingly, if the selected actuator position configuration exceeds the filtering restraints, at step 224, the selected actuator configuration is disqualified and the method returns to step 220 (with the previous selected actuator position configuration unavailable for selection). If the selected actuator position configuration meets the filtering restraints, the method proceeds to step 226 where the selected actuator position configuration is stored as the optimal actuator position configuration for that particular driving condition.

The process of determining the optimal actuator position configuration to minimize overall power consumption of cooling system 10 can be repeated for multiple driving conditions. For example, FIG. 5 illustrates various driving conditions for which to determine optimal actuator position configuration of the previously selected group hardware combination. In this way, the method first provides hardware component selection to minimize overall energy consumption of cooling system 10 during typical driving conditions. Then, for the selected group hardware combination, the method further optimizes the system by determining the optimal actuator position configuration for a plurality of driving conditions that will result in the lowest overall energy consumption for cooling system 10. In this way, controller 26 can automatically transition each hardware component to the optimal actuator position configuration in real time as vehicle driving conditions vary.

Described herein are systems and methods for minimizing overall energy or power consumption of a vehicle cooling system. The methods include a hardware selection step and an actuator position step. In the hardware selection step, hardware components are identified that have various types (e.g., sizes), and every possible hardware component combination is determined. The total power consumption for each combination is then determined, and the combination with the lowest overall energy consumption is selected if it does not exceed filtering constraints. In the actuator position step, all combinations of actuator positions for the previously selected hardware combination are determined, and the total power consumption for each actuator position combination is then determined. The actuator position combination for the selected group hardware combination with the lowest overall energy consumption is selected if it does not exceed filtering constraints. The actuator position step can be repeated for a multitude of predefined driving conditions. As such, the vehicle can be operated with the actuator position configuration that minimizes overall energy and power consumption of the vehicle cooling system, thereby increasing vehicle fuel economy.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of minimizing overall power consumption of a vehicle cooling system, the method comprising:
   performing a hardware selection phase, including:
      selecting a plurality of hardware components for the vehicle cooling system, at least one hardware component having a plurality of types thereof, each type affecting a power consumption of that hardware component such that each type of that hardware component has a different power consumption at a first predefined driving condition;
      determining all possible combinations of the selected hardware components and types thereof;
      for each possible hardware component combination, determining a first overall power consumption at the first predefined driving condition;
      comparing the determined first power consumptions of each of the possible hardware component combinations; and
      selecting a hardware component combination from all the possible combinations that has the lowest determined first overall energy consumption;
   performing an actuator position selection phase for the selected hardware component combination, including:
      defining a plurality of actuator positions for one or more of the hardware components of the selected hardware component combination;
      determining all possible actuator position configurations of the selected hardware component combination;
      for each possible actuator position configuration, determining a second overall power consumption of the selected hardware components at a second predefined driving condition; and
      selecting an actuator position combination from all the possible actuator position combinations that has the lowest determined second overall energy consumption; and
   configuring the vehicle cooling system to operate the selected hardware component combination at the selected actuator position combination when the vehicle is operating at the second predefined driving condition.

2. The method of claim 1, wherein the step of determining a first power consumption comprises:
   determining an individual power consumption for each hardware component of each possible combination of hardware components and type at the predefined driving condition; and
   for each hardware component combination, summing the individual power consumptions of all the hardware components to determine a first power consumption.

3. The method of claim 1, wherein the step of determining a second power consumption comprises:
   determining an individual power consumption for each hardware component of each possible actuator position configuration at a second predefined driving condition; and
   for each actuator position configuration, summing the individual power consumptions of all the hardware components to determine a second power consumption.

4. The method of claim 1, wherein the first and second predefined driving conditions are the same.

5. The method of claim 1, wherein the first and second predefined driving conditions are different.

6. The method of claim 1, wherein the second predefined driving condition is chosen from the group of:
   residential cruise with air conditioning;
   highway cruise with air conditioning;
   expressway cruise;
   expressway cruise with air conditioning;
   hot expressway cruise with air conditioning; and
   hot expressway trailer cruise with air conditioning.

7. The method of claim 1, wherein the plurality of types are size variations.

8. The method of claim 1, wherein the plurality of types are texture variations.

9. The method of claim 1, wherein the hardware components are selected from the group of a vehicle grille system, a cooling fan, a high temperature water pump, a low temperature water pump, a coolant control valve, and an AC compressor.

10. The method of claim 1, further comprising:
    determining if the selected hardware component combination exceeds vehicle durability filtering constraints;
    disqualifying the selected hardware component combination if the selected hardware component combination exceeds the vehicle durability filtering constraints; and
    selecting a new hardware component combination from all the remaining possible combinations that has the lowest determined first overall energy consumption.

11. The method of claim 1, further comprising:
determining if the selected actuator position configuration exceeds vehicle durability filtering constraints; and
disqualifying the selected actuator position configuration if the selected actuator position combination exceeds the vehicle durability filtering constraints.

12. The method of claim 11, wherein the step of determining if the selected actuator position configuration exceeds vehicle durability filtering constraints comprises:
defining an acceptable engine oil temperature (EOT) limit;
determining an EOT for each actuator position configuration at the second predetermined driving condition; and
disqualifying each hardware component configuration with a determined EOT greater than the acceptable EOT limit.

13. The method of claim 12, wherein the step of determining if the selected actuator position configuration exceeds vehicle durability filtering constraints further comprises:
defining an acceptable engine coolant temperature (ECT) limit at the second predetermined driving condition;
determining an ECT for each remaining actuator position configuration at the second predetermined driving condition; and
disqualifying each actuator position configuration with a determined ECT greater than the acceptable ECT limit.

14. The method of claim 13, wherein the step of determining if the selected actuator position configuration exceeds vehicle durability filtering constraints further comprises:
defining an acceptable delta engine temperature limit at the second predetermined driving condition;
determining a delta engine temperature for each remaining actuator position configuration at the second predetermined driving condition; and
disqualifying each actuator position configuration with a determined delta engine temperature greater than the acceptable delta engine temperature limit.

15. The method of claim 14, wherein the step of determining if the selected actuator position configuration exceeds vehicle durability filtering constraints further comprises:
defining an acceptable air charge temperature (ACT) limit at the second predetermined driving condition;
determining an ACT for each remaining actuator position configuration at the second predetermined driving condition; and
disqualifying each actuator position configuration with a determined ACT greater than the acceptable ACT limit.

16. The method of claim 15, wherein the step of determining if the selected actuator position configuration exceeds vehicle durability filtering constraints further comprises;
defining an acceptable cooling fan temperature limit at the second predetermined driving condition;
determining a cooling fan temperature for each remaining actuator position configuration at the second predetermined driving condition; and
disqualifying each actuator position configuration with a determined cooling fan temperature greater than the acceptable cooling fan temperature limit.

17. The method of claim 16, wherein the step of selecting an actuator position configuration comprises selecting an actuator position configuration from all the remaining possible actuator position configurations after the disqualified actuator position configurations are removed from consideration.

* * * * *